United States Patent
Nagato et al.

(10) Patent No.: US 7,438,771 B2
(45) Date of Patent: Oct. 21, 2008

(54) STEEL MATERIAL FOR HIGH STRENGTH CONSTANT VELOCITY JOINT INTERMEDIATE SHAFT AND HIGH STRENGTH CONSTANT VELOCITY JOINT INTERMEDIATE SHAFT

(75) Inventors: Takashige Nagato, Tokyo (JP); Tatsuro Ochi, Muroran (JP); Koji Nishi, Anjo (JP); Yuji Inagaki, Anjo (JP); Kazuyuki Ichikawa, Okazaki (JP); Isashi Kashiwagi, Kariya (JP); Toshiyuki Saito, Toyoake (JP)

(73) Assignees: Nippon Steel Corporation, Tokyo (JP); Toyoda Koki Kabushiki Kaisha, Aichi-Ken (JP)

( * ) Notice: Subject to any disclaimer, the term of this patent is extended or adjusted under 35 U.S.C. 154(b) by 322 days.

(21) Appl. No.: 11/250,834

(22) Filed: Oct. 13, 2005

(65) Prior Publication Data

US 2006/0076088 A1    Apr. 13, 2006

(30) Foreign Application Priority Data

Oct. 13, 2004    (JP) ............................. 2004-298770
Jun. 1, 2005     (JP) ............................. 2005-161505

(51) Int. Cl.
*C22C 38/02* (2006.01)
*C22C 38/04* (2006.01)
*C22C 38/14* (2006.01)

(52) U.S. Cl. ........................ 148/330; 148/334; 148/320

(58) Field of Classification Search ................. 148/320, 148/330, 333, 334, 572, 567, 328; 420/121, 420/123, 126, 128, 105, 106, 110
See application file for complete search history.

(56) References Cited

FOREIGN PATENT DOCUMENTS

| JP | 61186419 | 8/1986 |
|---|---|---|
| JP | 05320825 | 12/1993 |
| JP | 07090484 | 4/1995 |
| JP | 1036937 | 2/1998 |
| JP | 2000427334 | 1/2004 |
| WO | WO2004065646 | 8/2004 |

OTHER PUBLICATIONS

European Search Report for European Application No. EP 05 01 95 91.

*Primary Examiner*—Deborah Yee
(74) *Attorney, Agent, or Firm*—Dorsey & Whitney, LLP

(57) ABSTRACT

A steel material for a high strength constant velocity joint intermediate shaft is provided. The steal material may preferably contain C: 0.46 to 0.52%, Si: 0.6 to 0.8%, Mn: 0.7 to 0.9%, S: 0.01 to 0.05%, Mo: 0.3 to 0.5%, B: 0.0005 to 0.005%, Al: 0.002 to 0.05%, and Ti: 0.02 to 0.09%, restricting N to 0.007% or less, Cr to 0.15% or less, and P to 0.02% or less. A structural percentage of bainite+martensite may be provided which is 40% or more. The steal material may have a hardness of 250 HV to 340 HV. A high strength constant velocity joint intermediate shaft made of that steel material may be provided which has a spline-vanishing part with a surface hardness of about 610 HV to 750 HV, and a ratio t/r of an effective hardened layer depth t and radius r of 0.35 to 0.55, having a flat part with a surface hardness of about 630 HV to 770 HV and a ratio t/r of 0.55 to 1.0, and having a core hardness of about 250 HV to 340 HV.

4 Claims, 3 Drawing Sheets

STEEL MATERIAL FOR HIGH STRENGTH CONSTANT VELOCITY JOINT INTERMEDIATE SHAFT AND HIGH STRENGTH CONSTANT VELOCITY JOINT INTERMEDIATE SHAFT

FIELD OF THE INVENTION

The present invention relates to a steel material for a high strength constant velocity joint intermediate shaft and a high strength constant velocity joint intermediate shaft.

BACKGROUND INFORMATION

There has been a strong demand for increasing the strength of auto parts, in particular constant velocity joint intermediate shafts, in recent years along with the increased output of automobile engines and environmental regulations. The strength characteristics required for constant velocity joint intermediate shafts are mainly static torsional strength and torsional fatigue strength.

As the technology relating to the drive shafts among conventional auto parts, for example, a method of production of a drive shaft obtained by forming steel has been provided that includes C: 0.30 to 0.38%, Mn: 0.6 to 1.5%, B: 0.0005 to 0.0030%, Ti: 0.01 to 0.04, and Al: 0.01 to 0.04% into a drive shaft, making the ratio of the induction hardened depth by the induction hardening and the radius of the steel material 0.4 or more, and omitting the tempering after induction hardening has been proposed (for example, see Japanese Patent Publication No. 63-62571). This method does not consider the torsional fatigue strength taken particular note of as a strength characteristic in the present invention. Further, it is estimated from the amount of carbon that there is a self-limit to the level of the increase in strength.

Further, a solid shaft for a drive shaft has been provided which includes C: 0.38 to 0.45%, Si: 0.35% or less, Mn: 0.8 to 1.5%, B: 0.0005 to 0.0035%, Ti: 0.01 to 0.05, Al: 0.01 to 0.06%, and N: 0.01% or less, having a quenched hardened layer with a surface hardness of HRC55 or more obtained by induction hardening formed so as to have a ratio of the induction hardened depth/shaft radius of 0.45 or more, and having a torsional strength of 1.47 GPa or more in terms of the maximum shear stress value has been proposed (for example, see Japanese Patent Publication No. 5-320825). However, even if using a steel material with such a composition, the strength characteristics required for a high strength part such as a constant velocity joint intermediate shaft cannot be obtained at the present. This conventional shaft includes a shaft part that has a serration shaft, but does not consider the location of fracture or the mode of fracture. Further, it is estimated from the amount of carbon that there is a self-limit to the level of the increase in strength.

Further, a high strength, high frequency quenched shaft has been provided which includes C: 0.35 to 0.70%, Si: 0.01 to 0.15%, Mn: 0.2 to 2.0%, S: 0.005 to 0.15%, Al: 0.0005 to 0.05%, Ti: 0.005 to 0.05%, B: 0.0005 to 0.005%, and N: 0.002 to 0.02% and having an average hardness in the cross-section weighted by the square of the radius (value obtained by splitting part circularly concentrically in the radial direction, weighting the hardness of the links by the square of the radius, finding the sum, and obtaining the average) of 560 or more has been proposed (for example, see Japanese Patent Publication No. 7-90484). This conventional shaft included no consideration of the location of fracture and mode of fracture. Therefore, such conventional shaft should not be said to be a high strength shaft part optimally adjusted in distribution of hardness for each location of the part.

SUMMARY OF THE INVENTION

In the conventional steel materials described above, the superior static torsional strength characteristic and superior torsional fatigue strength characteristic required for a constant velocity joint intermediate shaft cannot be obtained. One of the objects of exemplary embodiments of the present invention is to solve this problem, and provide a steel material for a high strength constant velocity joint intermediate shaft and a high strength constant velocity joint intermediate shaft provided with a superior static torsional strength characteristic and a superior torsional fatigue strength characteristic.

A steel material for a high strength constant velocity joint intermediate shaft and a high strength constant velocity joint intermediate shaft has been obtained in accordance with the present invention which is provided with a superior static torsional strength characteristic and a superior torsional fatigue strength characteristic. As a result, it was determined that for fracture at the flat part of a constant velocity joint shaft, increasing the carbon content to 0.46% or more and deepening the hardened layer to increase the core hardness results in an improvement in the static torsional strength and torsional fatigue strength, but overly increasing the hardened layer depth likely causes the problem of a change in the fracture position from the flat part to the spline part. Further, by selecting the ingredients of high carbon steel and restricting the upper limit of the hardened layer depth at the spline part, spline fracture can be suppressed in accordance to one exemplary embodiment of the present invention.

Accordingly, one exemplary embodiment of the present invention provides a steel material for a high strength constant velocity joint intermediate shaft, which contains, by wt %,
C: 0.46 to 0.52%,
Si: 0.6 to 0.8%,
Mn: 0.7 to 0.9%,
S: 0.01 to 0.05%,
Mo: 0.3 to 0.5%,
B: 0.0005 to 0.005%,
Al: 0.002 to 0.05%, and
Ti: 0.02 to 0.09%, restricting
N to 0.007% or less
Cr to 0.15% or less (including 0%), and
P to 0.02% or less (including 0%), comprising
the balance of iron and unavoidable impurities, and
having a structural percentage of bainite+martensite of 40% or more and a hardness of 250 to 340 HV.

In accordance with another exemplary embodiment of the present invention, a high strength constant velocity joint intermediate shaft may be provided which contain, by wt %,
C: 0.46 to 0.52%,
Si: 0.6 to 0.8%,
Mn: 0.7 to 0.9%,
S: 0.01 to 0.05%,
Mo: 0.3 to 0.5%,
B: 0.0005 to 0.005%,
Al: 0.002 to 0.05%, and
Ti: 0.02 to 0.09%, restricting
N to less than 0.007%,
Cr to less than 0.15% (including 0%), and
P to less than 0.02% (including 0%), and comprising the balance of iron and unavoidable impurities, having a spline-vanishing part with a surface hardness of 610 to 750 HV and an effective hardened layer depth of 0.35 to 0.55 in terms of the ratio t/r of the effective hardened layer depth t and radius r, having a flat part with a surface hardness of 630 to 770 HV and an effective hardened layer depth of 0.55 to 1.0 in terms of the ratio t/r of the effective hardened layer depth t and radius r, and having a core hardness of 250 to 340 HV.

By using the steel material for a high strength constant velocity joint intermediate shaft and a high strength constant velocity joint intermediate shaft of the present invention, it is possible to obtain a superior static torsional strength and torsional fatigue strength characteristics.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which.

DETAILED DESCRIPTION

Figure 1:
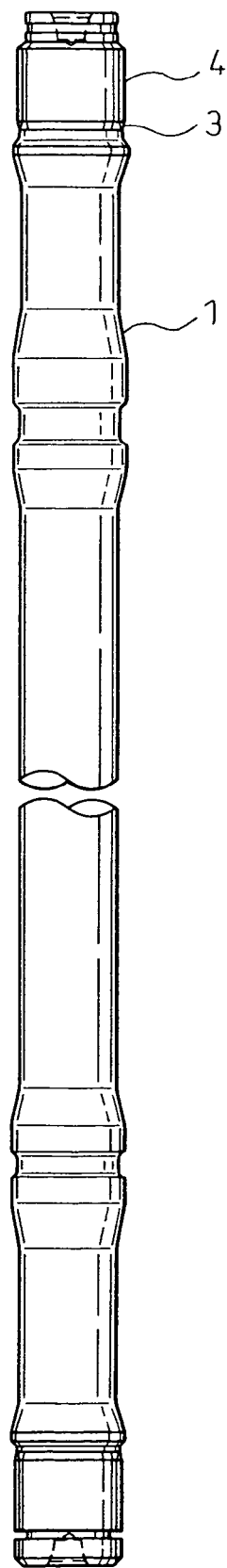
FIG. 1 is a side view of an exemplary embodiment of a constant velocity joint intermediate shaft according to the present invention.

In accordance with an exemplary embodiment of the present invention, a steel material can be provided for a high strength constant velocity joint intermediate shaft and a high strength constant velocity joint intermediate shaft. The "strength characteristics" referred to herein can be defined as, for the most part, the static torsional strength and torsional fatigue strength. To obtain torsional strength characteristics of the level greater than the conventional shaft parts, carbon steel of a high carbon content of 0.46% or more should be used.

In high carbon steel with a C content of 0.46% or more, for fracture at the flat part of the constant velocity joint shaft, the greater the hardened layer depth and the greater the core hardness, the better the static torsional strength and torsional fatigue strength. This is the case in particular when the effective hardened layer depth is 0.55 or more in terms of the ratio t/r of the effective hardened layer depth t and radius r and the core hardness is 250 HV or more, the strength characteristics are good. On the other hand, if the hardened layer depth becomes excessively great, the fracture position changes from the flat part to the spline part and the static torsional strength and torsional fatigue strength conversely fall.

In a constant velocity joint intermediate shaft that uses high carbon steel with a carbon content of 0.46% or more, in order to suppress the drop in strength due to fracture of the spline part, it is effective to add to the steel composition (a) Si: 0.6% or more, (b) Mo: 0.3% or more, and (c) B.

A spline part fracture can start from the spline-vanishing part. In a constant velocity joint intermediate shaft that uses high carbon steel with a carbon content of 0.46% or more, in order to suppress the drop in strength due to fracture of the spline part, in addition to rectification of the ingredients as explained above, it is effective to restrict the upper limit of the surface hardness of the spline-vanishing part and restrict the effective hardened layer depth to a range of t/r of 0.35 to 0.55.

In particular, in a constant velocity joint intermediate shaft that uses high carbon steel with a carbon content of 0.46% or more, to obtain superior torsional strength characteristics from the constant velocity joint intermediate shaft part, in addition to rectification of the ingredients as explained above, it is preferable to separately rectify the hardness distributions of the flat part and spline-vanishing part of the constant velocity joint intermediate shaft. Specifically, by restricting the effective hardened layer depth t/r at the flat part to 0.55 to 1.0 and at the spline-vanishing part 0.35 to 0.55. It is also important to further restrict the upper limit of the surface hardness of the spline-vanishing part and making the core hardness a range of 250 to 340 HV. Thus, it becomes possible to increase the strength of the constant velocity joint intermediate shaft.

Next, the constant velocity joint intermediate shaft can be heat treated by induction hardening, and the induction hardening is rapid heating. Thus, if the structure before induction hardening contains coarse ferrite or cementite, it becomes difficult to obtain a uniform structure and hardness after induction hardening. In particular, if adding (as the steel material composition) Si in an amount of 0.6% or more, the induction hardenability likely deteriorates, and uneven hardness etc. are liable to occur after the induction hardening. In contrast, by making the structure before induction hardening a structure that is primarily comprised of bainite or martensite so that the structural percentage of bainite+martensite is 40% or more, a uniform structure and hardness can be easily obtained after high frequency quenching.

Further, a constant velocity joint intermediate shaft is likely not heat treated at its core even after the induction hardening. In particular, the core of a constant velocity joint intermediate shaft may have the structure and hardness of the material as it is, thus it is preferable to build-in the structure and hardness at the material stage. In order to obtain superior strength characteristics as a constant velocity joint intermediate shaft, it can be effective that not only the surface hardness, but also the core hardness should be relatively high. Therefore, it is preferable to make the structure of the material, before high frequency quenching, a structure which is mainly comprised of bainite or martensite and raise the hardness of the material to the range of 250 to 340 HV.

The exemplary embodiment of the shaft in accordance with the present invention is based on this above considerations. Provided below is the description of varies elements of the exemplary embodiment of the present invention, and techniques therefor.

C is an element effective for giving the necessary strength to steel. However, if less than 0.46% is present, it is likely not possible to secure the torsional strength or other necessary strength, while if over 0.52% is present, the steel can become hard and the cold workability, in particular the machineability, deteriorates, so a range of about 0.46 to 0.52% of C is preferable.

Si can be added for the purpose of strengthening the grain boundaries of the prior austenite grain boundaries and as a deoxidizing element. If less than 0.6% is present, the effect of strengthening the grain boundaries is insufficient. On the other hand, if over 0.8% is present, a rise in hardness is invited and the cold workability, in particular the machineability, deteriorate. For the above reasons, the content of Si should preferably be in the range of about 0.6 to 0.8%.

Mn is an element effective for improving the induction hardenability. To secure a sufficient hardenability, if less than 0.7% is present, the effect may be insufficient. On the other hand, if over 0.9% of Mn is present, a remarkable rise in hardness is invited and the cold workability and machineability deteriorate. Thus, it is preferable that Mn is in the range of about 0.7 to 0.9%.

S forms MnS in the steel, and is generally added for the purpose of improving the machineability due to it. If less than 0.01%, the effect is insufficient. On the other hand, if over 0.05%, the effect is saturated and, rather, the MnS becomes a cause of hardening cracks etc. For the above reasons, the content of S has to be made the range of 0.01 to 0.05%.

Mo is an element effective for imparting strength and hardenability to steel and improving the grain boundary strength after induction hardening to increase the strength characteristics. If less than 0.3%, the effect is insufficient, while if over 0.5%, a rise in the hardness is invited and the cold workability and machineability deteriorate. For the above reasons, the content has to be made a range of Mo of 0.3 to 0.5%.

B imparts hardenability to steel at the time of induction hardening and improves the grain boundary strength of the induction hardened material, so is added for the purpose of improving the torsional strength characteristic. If added in an amount of less than 0.0005%, the above effect is insufficient, while if over 0.005%, the effect becomes saturated, so the content has to be made a range of 0.0005 to 0.005%.

Al is added as a deoxidizing agent. If less than 0.002%, its effect is insufficient. On the other hand, if over 0.05%, its effect becomes saturated and conversely the toughness is deteriorated. For the above reasons, the content has to be made the range of 0.002 to 0.05%.

Ti forms TiN and TiC in steel. The addition of Ti (a) forms TiN to prevent the precipitation of BN due to the solid solution N, that is, secures solid solution B, and (b) makes the prior austenite grains finer by fine dispersion of TiC. However, if less than 0.02%, the effect is insufficient. On the other hand, if Ti is added in an amount over 0.09%, precipitation hardening due to TiC becomes remarkable. The cold workability and machineability remarkably deteriorate. For the above reasons, the content has to be made the range of Ti of 0.02 to 0.09%. In particular, to obtain a remarkable effect of increasing the fineness of the prior austenite grains, a range of Ti of over 0.05 to 0.09% is preferable.

N is preferably extremely limited for the following two reasons. (a) B, as explained above, is added to improve the hardenability, strengthen the grain boundaries, etc., but these effects of B first are manifested in the state with B in solid solution in the steel, so it is necessary to reduce the amount of N to suppress the formation of BN. (b) Further, N forms coarse TiN if bonding with Ti in the steel and increases the hardness. TiN also becomes a cause of cold forging cracking. Therefore, the cold workability remarkably deteriorates. The above detrimental effect becomes particularly remarkable when the amount of N is over 0.007%. For the above reasons, the content has to be made 0.007% or less.

Cr dissolves in the cementite and stabilizes the cementite. At the time of the short time heating of induction hardening, the dissolution in the cementite is liable to become poor, which cases uneven hardness. This behavior becomes remarkable particularly when over 0.15%. For the above reasons, the content has to be limited to 0.15% or less (including 0%).

P makes the grain boundaries of the part after induction hardening and tempering brittle and therefore causes deterioration of the static torsional strength and torsional fatigue strength of the final product. In particular, when P is over 0.02%, the drop in strength becomes remarkable, so 0.02% (including 0%) was made the upper limit.

Next, in accordance with the present invention, the structural percentage of the bainite+martensite is 40% or more and the hardness can be provided between 250 HV and 340 HV. A constant velocity joint intermediate shaft is heat treated by induction hardening, but induction hardening is rapid heating. Thus, if the structure before induction hardening includes coarse ferrite or cementite, it becomes difficult to obtain a uniform structure and hardness after induction hardening. In contrast, by making the structure before induction hardening a structure mainly comprised of bainite or martensite, it becomes possible to obtain a uniform structure and hardness after induction hardening. Further, a constant velocity joint intermediate shaft is generally not heat treated at its core even after induction hardening. That is, the core of a constant velocity joint intermediate shaft has the structure and hardness of the material as it is, so it is important that the structure and hardness be built in at the stage of the material.

To obtain preferred strength characteristics as a constant velocity joint intermediate shaft, it can be effective that in addition to surface hardness, the core hardness also be high. Therefore, making the structure before induction hardening a structure mainly comprised of bainite or martensite is effective. If the structural percentage of bainite+martensite is less than 40%, the effect of securing the above induction hardenability or core hardness is insufficient, so the structural percentage of the bainite+martensite was made 40% or more. Note that, when desiring higher strength, the structural percentage of the bainite+martensite is preferably least 50%, more preferably at least 70%. Here, the ferrite forming a bainite structure (so-called bainitic ferrite) is treated as a bainite structure. Note that the remaining structure other than the bainite and martensite is pearlite and pro-eutectoid ferrite. The pro-eutectoid ferrite is substantially preferably 10% or less. In this manner, the structure defining the structural percentage in the present invention is the structure of the region other than the decarburized layer of the outermost layer.

Further, if the material hardness is less than 250 HV, the effect of securing the hardness of the core of the above constant velocity joint intermediate shaft is insufficient. On the other hand, if over 340 HV, the deterioration of the machinability at the time of forming the constant velocity joint intermediate shaft becomes remarkable. From the above, the range of hardness can be made from 250 HV to 340 HV.

The above structural percentage and hardness can be obtained by producing the exemplary steel material of the present invention under conditions of a hot rolling heating temperature of 950° C. to 1150° C., a finishing rolling temperature of 800° C. to 1000C, and a cooling rate after rolling (average cooling rate between 800° C. to 500° C.) of 0.4° C. to 1.2° C./sec.

Next, an exemplary embodiment of the present invention provides a constant velocity joint intermediate shaft comprised of the above mentioned steel composition, having a spline-vanishing part with a surface hardness of 610 HV to 750 HV and an effective hardened layer depth of 0.35 to 0.55 in terms of a ratio t/r of the effective hardened layer depth t and radius r, having a flat part with a surface hardness of 630 HV to 770 HV and an effective hardened layer depth of 0.55 to 1.0 in terms of t/r, and having a core hardness of 250 HV to 340 HV. The "effective hardened layer depth" referred to in the present invention is the effective hardened layer depth based on the high frequency quenched and hardened layer depth measurement method defined in JIS G0559. Further, the surface hardness is the hardness of the surface converted to martensite by induction hardening. It is possible to use the average hardness of the region of 0.1 to about 1 mm from the surface or represent the hardness by the hardness at a certain depth in this region. In the present invention, the reason for limiting the surface hardness and effective hardened layer depth in this way are explained below.

For fracture at the flat part, the higher the surface hardness, the deeper the effective hardened layer depth, and the higher the core hardness, the better the torsional strength. However, if the surface hardness is less than 630 HV, the effect in increasing the strength is insufficient, while if over 770 HV, the effect becomes saturated and conversely re-straightening cracks are liable to occur, so the flat part is given a surface hardness of 630 to 770 HV. Further, if the flat part has an effective hardened layer depth of less than 0.55 in t/r, the effect in improving the strength becomes insufficient, so the flat part is given an effective hardened layer depth of 0.55 to 1.0. Note that if desiring a further higher level of strength, the flat part is preferably given an effective hardened layer depth 0.65 to 1.0 in t/r. Further, when aiming at super-high strength, it is preferable that the flat part have an effective hardened layer depth of 0.75 to 1.0 in terms of t/r.

In addition, for fracture at the spline part, the spline-vanishing part can form the starting point. In this case as well, an increase in the surface hardness and an increase in the effective hardened layer depth are effective for improving the strength up to a certain level, but if exceeding that level, the strength falls. That is, if the surface hardness is less than 610 HV, if the effective hardened layer depth is less than 0.35 in terms of t/r, the effect in improving the strength is insufficient. On the other hand, if the surface hardness exceeds 750 HV and the t/r of the effective hardened layer depth exceeds 0.55, conversely a drop in strength is caused. The detrimental effect when making the effective hardened layer depth greater is due to the reduction in the compressive residual stress of the surface layer. From the above reasons, the spline-vanishing part was made one with a surface hardness of 610 HV to 750 HV and an effective hardened layer depth of 0.35 to 0.55 in terms of t/r. Note that when desiring a much higher level of strength, it is preferable to make the effective hardened layer depth of the spline-vanishing part 0.35 to 0.50 in terms of t/r.

Further, according to the exemplary embodiment of the present invention, the core hardness was defined as 250 HV to 340 HV for the following reasons. To obtain a preferable and superior strength characteristics of the constant velocity joint intermediate shaft, as explained above, it is effective that not only the surface hardness, but also the core hardness be high. If the core hardness is less than 250 HV, the effect of securing the strength of the constant velocity joint intermediate shaft is insufficient. On the other hand, if over 340 HV, the deterioration in the machineability at the time of forming the constant velocity joint intermediate shaft becomes remarkable. From the above, the range of core hardness was made 250 HV to 340 HV.

The spline-vanishing part and flat part can be adjusted in surface hardness and effective hardened layer depth by rectifying the combination of the amount of input of power at the time of high frequency heating, speed of movement, start of movement at the time of high frequency heating, setting of the end position, and the tempering conditions after high frequency quenching. Note that, as shown in FIG. 1, the "spline-vanishing part 3" means the part where the spline grooves of the spline part 4 become gradually shallower toward the center of the shaft in the axial direction.

EXAMPLE 1

Sample materials of the chemical compositions shown in Table 1 were melted in a vacuum melting furnace, formed into angular shapes of 162 mm by blooming, then hot rolled to steel rods of diameters of 24 mm. These steel rod materials were measured for hardness and structural percentage. The results are shown in Table 2.

These steel rods were cut and formed to work them into constant velocity joint intermediate shafts of the exemplary shapes shown, e.g., in FIG. 1 which were then induction hardened and tempered.

Figure 2:
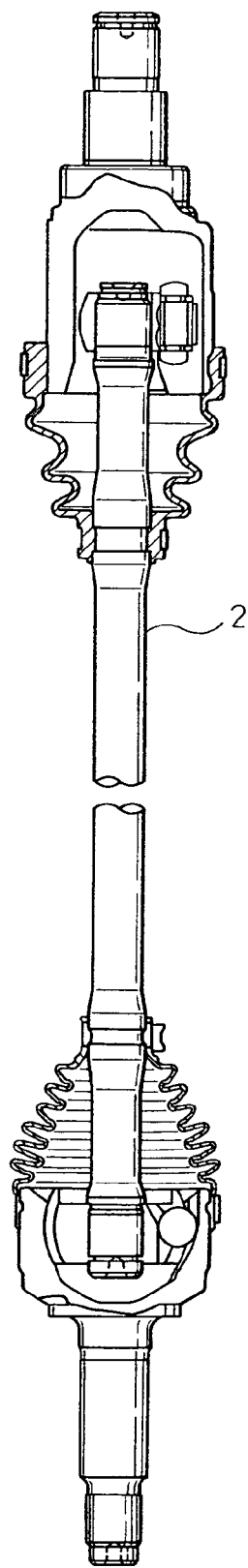
FIG. 2 is a side view of the constant velocity joint unit shown in FIG. 1 used for an evaluation of strength.

An exemplary embodiment of an intermediate shaft prepared as a prototype was assembled as part of a constant velocity joint and tested for static torsional strength and torsional fatigue strength in the state of the constant velocity joint unit shown in FIG. 2. FIG. 1 and FIG. 2 show a constant velocity joint intermediate shaft 1, a constant velocity joint unit 2, a spline-vanishing part 3, and a spline part 4. The depth of the hardened layer was measured based on the high frequency quenched hardened layer depth measurement method defined in JIS G0559 to find the hardened layer ratio. The surface hardness was measured at a depth of 0.5 mm by a MicroVicker's hardness meter at a load of 300 gf and represented by the obtained hardness. Further, the crystal grain size was measured by the method described in JIS G0551.

The hardness and other material characteristics and static torsional strength of the parts of the constant velocity joint intermediate shaft after induction hardening are shown in Table 3. It is determined that the static torsional strength of the invention steel is increased by a level of 18% or more compared with the comparative examples. Comparative Example 3 is inferior to the examples of the exemplary embodiments of the present invention in strength characteristics because the C, Si, and Mo of the comparative steel are below the range of the present invention and because Cr is higher than the range of the present invention. Further, it is learned that even if the steel ingredients are in the range of the present invention, if as shown in Comparative Examples 1 and 2, the structure and hardness of the material are outside the range of the present invention and the surface hardness and effective hardened layer depth after the induction hardening are outside the range of the present invention, a sufficient static torsional strength cannot be obtained.

Figure 3:
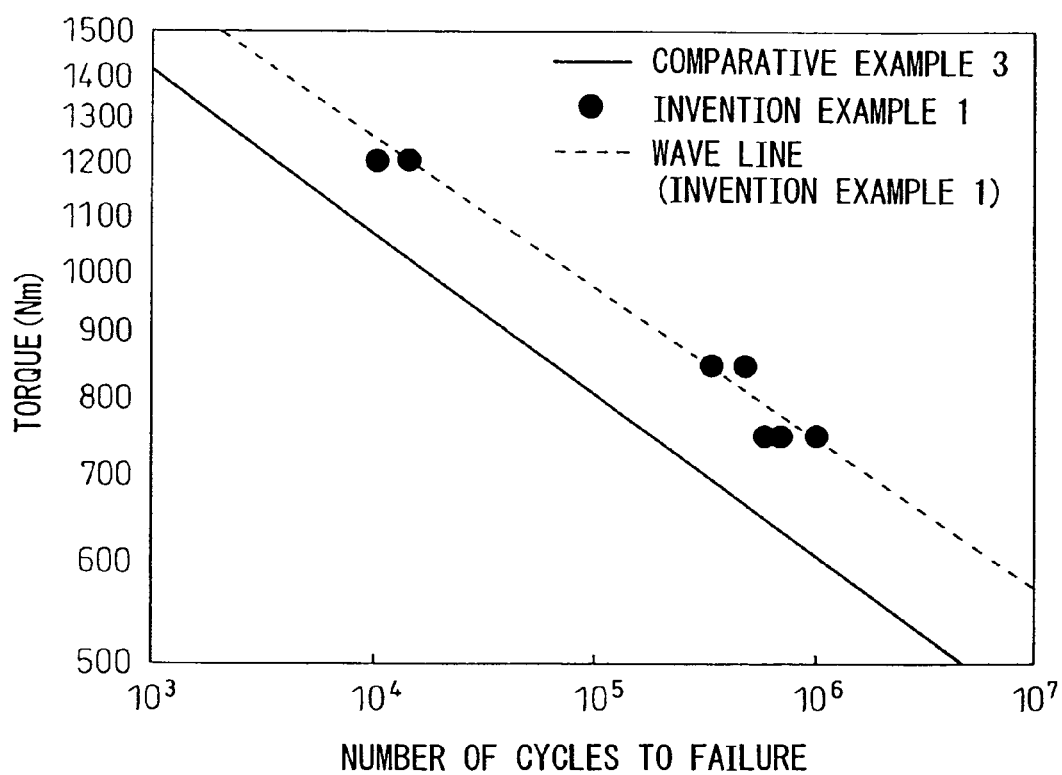
FIG. 3 is a graph of torsional fatigue strength characteristics of a developed part and a comparative example, in accordance with the present invention.

Next, the results of the evaluation of the torsional fatigue strength are shown in FIG. 3. The conditions of the torsional fatigue test were reversed stress (stress ratio: −1) and a stress waveform of a sine wave. Example 1 is directed to an exemplary embodiment of the present invention which provides a constant velocity joint intermediate shaft as shown in Table 3, while Comparative Example 3 provides a constant velocity joint intermediate shaft of Comparative Example 3 of Table 3. The results of Comparative Example 3 are shown only via a line. Based on such situation, if viewed by fatigue strength at 105 cycles, it is determined that Comparative Example 3 achieved a level of 800 Nm, while Invention Example 1 achieved a level of 950 to 970 Nm. In torsional fatigue strength as well, Invention Example 1 achieved a level 18% or more higher than Comparative Example 3.

TABLE 1

| Class | Steel no. | C | Si | Mn | S | Mo | B | Al | Ti | N | Cr | P |
|---|---|---|---|---|---|---|---|---|---|---|---|---|
| | | | | | | (wt %) | | | | | | |
| Composition of inv. steel | I | 0.50 | 0.70 | 0.78 | 0.025 | 0.40 | 0.0020 | 0.004 | 0.076 | 0.0040 | 0.04 | 0.006 |
| Composition of comp. steel | II | 0.45 | 0.27 | 1.50 | 0.012 | — | 0.0022 | 0.027 | 0.030 | 0.0067 | 0.19 | 0.020 |

TABLE 2

| Steel material no. | Steel no. | Heating temp. | Finishing temp. | Cooling rate after rolling | Bainite + martensite structure percentage ≧ 40% | Material hardness HV 250 to 340 |
|---|---|---|---|---|---|---|
| A | I Invention Steel composition | 1070° C. | 880° C. | 0.75° C./sec | 75% | 290 |
| B | I Invention Steel composition | 960 | 830 | 0.75° C./sec | 50% | 280 |
| C | I Invention Steel composition | 1050° C. | 850° C. | 0.35 | 25% | 240 |
| D | II Comparative Steel composition | 1100° C. | 940° C. | 0.75 | 35% | 265 |

TABLE 3

| Class | Steel material no. (Table 2) | Steel no. (Table 1) | Part | Surface hardness HV | Effective hardened layer depth 0.35 to 0.55 | Breakage torque Nm |
|---|---|---|---|---|---|---|
| Range of invention | | | Spline part | 610 to 750 | 0.35 to 0.55 | |
| | | | Flat part | 630 to 770 | 0.55 to 1.0 | |
| Inv. Ex. 1 | A | I | Spline part-1 | 692 | 0.44 | 2491 |
| | | | Spline part-2 | 680 | 0.50 | |
| | | | Flat part-1 | 709 | 0.83 | |
| | | | Flat part-2 | 719 | 0.79 | |
| Inv. Ex. 2 | B | I | Spline part-1 | 686 | 0.45 | 2476 |
| | | | Spline part-2 | 682 | 0.49 | |
| | | | Flat part-1 | 720 | 0.77 | |
| | | | Flat part-2 | 714 | 0.76 | |
| Comp. Ex. 1 | A | I | Spline part-1 | 621 | 0.45 | 2114 |
| | | | Spline part-2 | 615 | 0.42 | |
| | | | Flat part-1 | 618 | 0.48 | |
| | | | Flat part-2 | 616 | 0.52 | |
| Comp. Ex. 2 | C | I | Spline part-1 | 627 | 0.45 | 2041 |
| | | | Spline part-2 | 624 | 0.48 | |
| | | | Flat part-1 | 654 | 0.58 | |
| | | | Flat part-2 | 659 | 0.57 | |
| Comp. Ex. 3 | D | II | Spline part-1 | 648 | 0.43 | 2098 |
| | | | Spline part-2 | 673 | 0.45 | |
| | | | Flat part-1 | 672 | 0.38 | |
| | | | Flat part-2 | 678 | 0.36 | |

As explained above, if using the steel material for a high strength constant velocity joint intermediate shaft and the high strength constant velocity joint intermediate shaft of the present invention, it is possible to obtain superior static torsional strength and superior torsional fatigue strength characteristics as a constant velocity joint intermediate shaft.

While the invention has been described with reference to specific embodiments chosen for purpose of illustration, it should be apparent that numerous modifications could be made thereto by those skilled in the art without departing from the basic concept and scope of the invention. In addition, all references, publications and patent applications referenced above are incorporated here by reference in their entireties.

What is claimed is:

1. A high strength constant velocity joint intermediate shaft, comprising by wt %,
C: 0.46 to 0.52%,
Si: 0.6 to 0.8%,
Mn: 0.7 to 0.9%,
S: 0.01 to 0.05%,
Mo: 0.3 to 0.5%,
B: 0.0005 to 0.005%,
Al: 0.002 to 0.05%,
Ti: 0.02 to 0.09%,
N: less than 0.007%,
Cr: less than 0.15% (including 0%),
P: less than 0.02% (including 0%), and
the balance of iron and unavoidable impurities; and
further comprising:
   a spline-vanishing part having a surface hardness of approximately 610 HV to 750 HV and an effective hardened layer depth of approximately 0.35 to 0.55 in terms of a ratio t/r, wherein t is the effective hardened layer and r is a radius, and
   a flat part having a surface hardness of approximately 630 HV to 770 HV and an effective hardened layer depth of approximately 0.55 to 1.0 in terms of the ratio t/r, and having a core hardness of approximately 250 HV to 340 HV.

2. The material according to claim 1, wherein the surface hardness, the effective hardened layer of the spline vanishing part and flat part and the core hardness of the flat part is configured to increase a torsional strength and a torsional fatigue strength of the steel material.

3. A steel material article for a high strength constant velocity joint intermediate shaft, comprising by wt %,
C: 0.46 to 0.52%,
Si: 0.6 to 0.8%,
Mn: 0.7 to 0.9%,
S: 0.01 to 0.05%,
Mo: 0.3 to 0.5%,
B: 0.0005 to 0.005%,
Al: 0.002 to 0.05%, and
Ti: 0.02 to 0.09%.
N: 0.007% or less
Cr: 0.15% or less (including 0%).
P: 0.02% or less (including 0%).
the balance of iron and unavoidable impurities,
bainite+martensite that have a structural percentage of 40% or more and a hardness of 250 to 340 HV, and a flat part having a surface hardness of approximately 630 HV to 770 HV and a core hardness of approximately 250 HV to 340 HV;

wherein the flat part has a depth of an effective hardened layer of approximately 0.55 to 1.0 in terms of the ratio t/r, and wherein t is the effective hardened layer and r is a radius; and further comprising a spline-vanishing part having a surface hardness of approximately 610 HV to 750 HV and an effective hardened layer depth of approximately 0.35 to 0.55 in terms of the ratio t/r.

4. The material according to claim 3, wherein the surface hardness, the effective hardened layer of the spline vanishing part and flat part and the core hardness of the flat part is configured to increase a torsional strength and a torsional fatigue strength of the steel material.

* * * * *